United States Patent Office 3,600,170
Patented Aug. 17, 1971

3,600,170

IMAGE FORMING MATERIAL AND METHOD OF FORMING AN IMAGE THEREFROM

Marilyn Levy, Red Bank, N.J., assignor to the United States of America as represented by the Secretary of the Army No Drawing. Filed Sept. 2, 1969, Ser. No. 854,728
Int. Cl. B41m *5/26*; G03c *1/72*
U.S. Cl. 96—114.6 3 Claims

ABSTRACT OF THE DISCLOSURE

A dry photographic recording system is described that utilizes silver abietate as both the light sensitive element and the film-forming vehicle. The silver abietate is dissolved in an organic solvent and the resulting solution coated onto a suitable substrate. A print-out image formed by exposing the coated substrate through a negative to light is developed and at the same time desensitized to further action of light by heat.

The invention described herein may be manufactured, used and licensed by or for the Government for governmental purposes without the payment to me of any royalty thereon.

BACKGROUND OF THE INVENTION

This invention relates to a new photographic image forming material, to wit, silver abietate, and to a method of forming a print-out image therefrom that develops and stabilizes with heat.

Photographic systems are known wherein a print-out image is formed by light. These images as a rule must be stored in the dark because the unexposed area is light sensitive and will darken on exposure to light. Chemical processing can be used to stabilize these images but this involves the application of liquid stabilizers and drying procedures. In addition, most light sensitive systems require that the light sensitive element be dispersed in some film forming material such as gelatin, agar, or some synthetic or natural resin, or polymer solution.

SUMMARY OF THE INVENTION

The general object of this invention is to provide a dry photographic recording system that does not require wet processing or a separate fixing step. A further object of this invention is to provide such a system wherein a single silver salt will serve as both the photographic or light sensitive element and the film forming material.

According to the invention, silver abietate is dissolved in an organic solvent and the resulting solution applied to a suitable substrate. After evaporation of the organic solvent, a film is formed over the substrate. When portions of the film coated substrate are exposed through a negative to light, a faint print-out image is formed in the exposed areas. This application of heat then serves to both develop the image to a darker color and to desensitize the unexposed area to further action by light.

DESCRIPTION OF THE PREFERRED EMBODIMENT

A solution of silver abietate is prepared by dissolving 30 grams of abietic acid in one liter of water containing three grams of sodium hydroxide. This solution is filtered and added gradually to a solution containing 17 grams of silver nitrate in a liter of water to which a few drops of concentrated nitric acid has been added. A curdy white precipitate is immediately formed. This is filtered in a Buchner funnel and the precipitate washed several times in water. A small amount of precipitate can then be dissolved in a suitable organic solvent as for example, methyl ethyl ketone, acetone, essential oils or terpenes, etc., and the solution poured on a piece of filter paper. The filter paper is then exposed through a negative to a fluorescent black light source in a conventional manner. A faint print-out image is visible in the exposed area. This image darkens slightly on the application of heat from a heat gun rated at 500 to 750° F., held at a distance of approximately 12 inches from the substrate for 30 seconds to 3 minutes. The unexposed area becomes desensitized to further action by light after heat development and can be subjected to long periods of light exposure and subsequent heat development without any appreciable coloring.

We wish it to be understood that we do not desire to be limited to the exact detail sdescribed, for obvious modifications will occur to a person skilled in the art.

What is claimed is:

1. A dry method of making a photographic image including the steps of (A) dissolving silver abietate in an organic solvent,
(B) coating the resulting solution onto a suitable substrate,
(C) evaporating off the organic solvent to form a film and exposing the film coated substrate through a negative to light to form an image, and
(D) developing the exposed areas with heat to form a darker image and at the same time desensitizing the unexposed area of said film coating to further action by light with the sole application of heat.

2. A method according to claim 1 wherein the organic solvent is selected from the group consisting of methyl ethyl ketone, acetone, essential oils and terpenes.

3. A method according to claim 1 wherein heat is applied to the coated substrate from a heat gun rated at 500 to 750° F. and held at a distance of about 12 inches from the substrate for about 30 seconds to about 3 minutes.

References Cited

UNITED STATES PATENTS

| | | | |
|---|---|---|---|
| 2,739,893 | 3/1956 | Levy | 96—114.6 |
| 2,759,819 | 8/1956 | Levy et al. | 96—114.6 |
| 3,330,663 | 7/1967 | Weyde et al. | 96—114.6 |
| 3,373,020 | 3/1968 | Tomanek | 260—105 |

JOHN T. GOOLKASIAN, Primary Examiner

G. W. MOXON II, Assistant Examiner

U.S. Cl. X.R.

96—114.1; 117—36.7; 250—65F, 65T